(12) United States Patent
Duane

(10) Patent No.: US 8,307,210 B1
(45) Date of Patent: Nov. 6, 2012

(54) METHOD AND APPARATUS FOR SECURE VALIDATION OF TOKENS

(75) Inventor: William M. Duane, Westford, MA (US)

(73) Assignee: EMC Corporation, Hopkinton, MA (US)

(*) Notice: Subject to any disclaimer, the term of this patent is extended or adjusted under 35 U.S.C. 154(b) by 1016 days.

(21) Appl. No.: 12/114,245

(22) Filed: May 2, 2008

(51) Int. Cl.
H04L 29/06 (2006.01)

(52) U.S. Cl. ........ 713/172; 713/159; 713/182; 713/183; 713/184; 713/185; 713/186; 713/194; 726/9; 726/20; 709/225; 709/229; 380/42; 380/43; 380/44

(58) Field of Classification Search .................. 713/159, 713/172, 194, 182–186; 709/225, 229; 726/9, 726/20; 380/42–44
See application file for complete search history.

(56) References Cited

U.S. PATENT DOCUMENTS

| | | |
|---|---|---|
| 4,424,414 A | 1/1984 | Hellman et al. |
| 4,567,600 A | 1/1986 | Massey et al. |
| 4,606,042 A | 8/1986 | Kahn et al. |
| 4,720,860 A | 1/1988 | Weiss |
| 4,759,063 A | 7/1988 | Chaum |
| 4,856,062 A | 8/1989 | Weiss |
| 4,885,778 A | 12/1989 | Weiss |
| 4,947,430 A | 8/1990 | Chaum |
| 4,998,279 A | 3/1991 | Weiss |
| 5,023,908 A | 6/1991 | Weiss |
| 5,058,161 A | 10/1991 | Weiss |
| 5,097,505 A | 3/1992 | Weiss |
| 5,168,520 A | 12/1992 | Weiss |
| 5,201,000 A | 4/1993 | Matyas et al. |
| 5,222,140 A | 6/1993 | Beller et al. |
| 5,237,614 A | 8/1993 | Weiss |
| 5,241,599 A | 8/1993 | Bellovin et al. |
| 5,253,295 A | 10/1993 | Saada et al. |
| 5,351,298 A | 9/1994 | Smith |
| 5,361,062 A | 11/1994 | Weiss et al. |
| 5,367,572 A | 11/1994 | Weiss |
| 5,373,558 A | 12/1994 | Chaum |

(Continued)

FOREIGN PATENT DOCUMENTS

EP 1050789 11/2000
(Continued)

OTHER PUBLICATIONS

Hans-Peter Konigs, Cryptographic Identification Methods for Smart Cards in the Process of Standardization, Jun. 1991, IEEE Communication Magazine.*

(Continued)

*Primary Examiner* — Taghi Arani
*Assistant Examiner* — Josnel Jeudy
(74) *Attorney, Agent, or Firm* — BainwoodHuang

(57) ABSTRACT

A method for validating a cryptographic token includes (a) operating the cryptographic token to generate a pseudo-random number for authentication purposes by using a cryptographic seed uniquely associated with the cryptographic token, the cryptographic seed having been cryptographically generated using a precursor value, (b) receiving a first value from the cryptographic token, the first value being the pseudo-random number generated by the cryptographic token, (c) inputting the first value and the precursor value into a trusted computing platform, and (d) operating the trusted computing platform to generate a validation signal if the first value can be derived using a specified algorithm from the precursor value, but to generate a failure signal if the first value cannot be derived using the specified algorithm from the precursor value. Accompanying methods and apparatus are also provided.

14 Claims, 5 Drawing Sheets

U.S. PATENT DOCUMENTS

| | | | |
|---|---|---|---|
| 5,440,635 | A | 8/1995 | Bellovin et al. |
| 5,485,519 | A | 1/1996 | Weiss |
| 5,602,918 | A | 2/1997 | Chen et al. |
| 5,657,388 | A | 8/1997 | Weiss |
| 5,724,428 | A | 3/1998 | Rivest |
| 5,745,576 | A | 4/1998 | Abraham et al. |
| 5,835,600 | A | 11/1998 | Rivest |
| 5,841,866 | A | 11/1998 | Bruwer et al. |
| 5,903,721 | A | 5/1999 | Sixtus |
| 5,953,420 | A | 9/1999 | Matyas et al. |
| 6,076,163 | A | 6/2000 | Hoffstein et al. |
| 6,091,819 | A | 7/2000 | Venkatesan et al. |
| 6,130,621 | A | 10/2000 | Weiss |
| 6,240,184 | B1 | 5/2001 | Huynh et al. |
| 6,269,163 | B1 | 7/2001 | Rivest et al. |
| 6,286,022 | B1 | 9/2001 | Kaliski et al. |
| 6,393,447 | B1 | 5/2002 | Jakobsson et al. |
| 6,411,715 | B1 | 6/2002 | Liskov et al. |
| 6,681,017 | B1 | 1/2004 | Matias et al. |
| 6,681,327 | B1 | 1/2004 | Jardin |
| 6,751,729 | B1 | 6/2004 | Giniger et al. |
| 6,813,354 | B1 | 11/2004 | Jakobsson et al. |
| 6,829,356 | B1 | 12/2004 | Ford |
| 6,985,583 | B1 | 1/2006 | Brainard et al. |
| 6,989,732 | B2* | 1/2006 | Fisher .......................... 340/3.1 |
| 7,111,172 | B1 | 9/2006 | Duane et al. |
| 7,197,639 | B1 | 3/2007 | Juels et al. |
| 7,219,368 | B2 | 5/2007 | Juels et al. |
| 7,242,766 | B1 | 7/2007 | Lyle |
| 7,356,696 | B1 | 4/2008 | Jakobsson et al. |
| 7,359,507 | B2 | 4/2008 | Kaliski |
| 7,363,494 | B2 | 4/2008 | Brainard et al. |
| 7,562,221 | B2 | 7/2009 | Nystrom et al. |
| 7,571,489 | B2 | 8/2009 | Ong et al. |
| 7,602,904 | B2 | 10/2009 | Juels et al. |
| 7,707,626 | B2* | 4/2010 | Albisu et al. ........................ 726/8 |
| 7,810,147 | B2 | 10/2010 | Duane et al. |
| 7,831,837 | B1 | 11/2010 | Duane et al. |
| 8,171,531 | B2* | 5/2012 | Buer .................................... 726/6 |
| 2002/0026345 | A1 | 2/2002 | Juels |
| 2002/0120592 | A1 | 8/2002 | Juels et al. |
| 2003/0079122 | A1* | 4/2003 | Asokan et al. ................ 713/156 |
| 2000/4017253 | | 1/2004 | Ishigami et al. |
| 2004/0234074 | A1 | 11/2004 | Sprunk |
| 2005/0015588 | A1 | 1/2005 | Lin et al. |
| 2005/0038741 | A1* | 2/2005 | Bonalle et al. ................... 705/40 |
| 2005/0091492 | A1 | 4/2005 | Benson et al. |
| 2005/0129247 | A1 | 6/2005 | Gammel et al. |
| 2006/0037073 | A1 | 2/2006 | Juels et al. |
| 2006/0041759 | A1 | 2/2006 | Kaliski et al. |
| 2006/0083228 | A1 | 4/2006 | Ong et al. |
| 2006/0256961 | A1* | 11/2006 | Brainard et al. ................ 380/44 |
| 2006/0294331 | A1 | 12/2006 | Forrer et al. |
| 2007/0124321 | A1 | 5/2007 | Szydlo |
| 2007/0174614 | A1 | 7/2007 | Duane et al. |
| 2010/0034383 | A1 | 2/2010 | Turk |
| 2011/0173684 | A1* | 7/2011 | Hurry et al. ........................ 726/6 |

FOREIGN PATENT DOCUMENTS

| | | |
|---|---|---|
| WO | 0048064 A1 | 8/2000 |
| WO | 2006089101 A2 | 8/2006 |

OTHER PUBLICATIONS

Bellovin et al., "Encrypted Key Exchange: Password-Based Protocols Secure Against Dictionary Attacks," Proceedings of the IEEE Symposium of Research in Security and Privacy, pp. 72-84, 1992.

Bellovin et al., "Augmented Encrypted Key Exchange: A Password-Based Protocol Secure Against Dictionary Attacks and Password File compromise," AT&T Bell Laboratories Technical Report, pp. 1-7, 1994.

Boneh et al., "On the Importance of Checking Cryptographic Protocols for Faults," (extended abstract), pp. 1-14, Jul. 26, 2001, retrieved from http://www.citeseer.nj.nec.com/boneh97importance.html.

Boneh et al., "Efficient Generation of Shared RSA Keys," pp. 1-21, Jul. 26, 2001, retrieved from http://citeseer.nj.nex.com/358268.html.

Cannetti et al., "Proactive Security: Long-Term Protection Against Break-Ins," CryptoBytes, 3:1-8, 1997.

Chaum, "Security Without Identification: Transaction Systems to Make Big Brother Obsolete," Communications of the ACM, 28: 1030-1044, 1985.

Chaum, "Blind Signatures for Untraceable Payments," Advances in Cryptology, Proceedings of the Crypto '82, Workshop on the Theory and Application of Cryptographic Techniques, Santa Barbara, CA, Aug. 23-25, 1982, New York, 1983.

Coron et al., "On the Secutiry of RSA Padding," Advances in Cryptology, Proceedings of the Crypto '99, pp. 1-18, Springer 1999.

Desmedt et al., "A Chosen Text Attack on the RSA Cryptosystem and Some Discrete Logarithm Schemes," Advances in Cryptology, Proceedings of the Crypto '85, pp. 516-522, Springer-Velag 1986.

Dierks et al., "The TLS Protocol Version 1.0," IETF RFC 2246, pp. -75, Jan. 1999, Jul. 25, 2001, retrieved from http://www.jetf.org/rfc/rfc2246.txt.

Frier et al., "The SSL 3.0 Protocol," Netscape Communications Corp., pp. 1-62; Nov. 18, 1996, retrieved Jul. 10, 2001 from http://home.netscape.come/eng/ss113/draft302.txt.

Gong, "Increasing Availability and Security of an Autherntication Service," IEEE Journal on Selected Areas in Communication, 11: 657-662, 1993.

Gong et al., "Protecting Poorly Chosen Secrets from Guessing Attacks," IEEE Journal of Selected Areas in Communications, 11: 648-656, 1993.

Gong, "Optimal Authentication Protocols Resistant to Password Guessing Attacks," Proceedings of the 8.sup.th IEEE Computer Security Foundations Workshop, Ireland, pp. 24-29, Jun. 13-15, 1995.

Halevi et al., "Public-Key Cryptography and Password Protocols," Proceedings of the Fifth ACM Conference on Computer and Communications Security, pp. 122-131, Nov. 3-5, 1998.

Heroux, "A Private Key Storage Server for DCE—Functional Specification," Open Software foundation, Request for Comments: 94.1,pp. 1-73, Nov. 1996, retrieved on Jul. 17, 2001 from http://www.opengroup.org/rfc/mirror-rfc/rfc94.1.txt.

Herzberg et al., "Proactive SEcret Sharing Or: How to Cope with Perpetual Leakage," Advances in Cryptology, Proceedings of the Crypto '95, pp. 339-352, California, Aug. 1995, Springer 1995.

Jablon, "Strong Password-Only Authenticated Key Exchange," ACM computer Communication Review, pp. 1-24, 1996.

Jablon, "Extended Password Key Exchange Protocols Immune to Dictionary Attack," Proceedings of the WETICE '97 Enterprise Security Workshop, pp. 248-255, 1997.

Juels et al., "Security of Blind Digital Signatures," Advances in Cryuptology, Proceedings of the Crypto '97, pp. 150-164, California, Aug. 1997, Springer 1997.

Kohl et al., "The Kerberos Network Authentication Service," RFC 1510, pp. 1-105, Internet Activities Board, Sep. 1993, retrieved on Jul. 10, 2001 from http://www.ietf.org/rfc/rfc1510.txt.

Law et al., "An Efficient Protocol for Authenticated Key Agreement," Technical Report CORR 98-05, pp. 1-16, Deparment of C&O, University of Waterloo, CAnada, Mar. 1998, revised Aug. 28, 1998.

Lim et al., "A Key Recovery Attack on Some Discrete Log-Based Schemes Using a Prime-Order Subgroup," Advances in Cryptology, Proceeding of the Crypto '97, vol. 1294 of Lecture Notes in Computer Science, pp. 249-263, Springer 1997.

Menezes et al., "Handbook of Applied Cryptography," Chapter 12 Key Establishment Protocols, Section 12.22 protocol Shamie's no-key protocol, p. 500, CRC Press, 1997.

M'Raihi, "Cost-Effective Payment Schemes with Privacy Regulation," Advances in Cryptology, Proceedings of ASIACRYPT '96, vol. 1163 of LNCS, pp. 266-275, 1996.

MacKenzie et al., "Secure Network Authentication with Password Identification," Submission to IEEE P1363 a working group, pp. 1-11, Jul. 30, 1999, retrieved Jul. 1, 2001 from http://www.manta.ieee.org/groups/:1363/studygroup/passwd.htm-1.

Monrose et al., "Password Hardening Based on Keystroke Dynamics," Proceedings of the 6.sup.th ACM Conference on Computer and Communications Security, pp. 73-82, Nov. 1-4, 1999, Singapore, retrieved Sep. 6, 2000 from http://www.acm.org/pubs/contents/proceedings/commsec/319709.

Perlman et al., "Secure Password-Based Protocol for Downloading a Private Key," Proceedings of the 1999 Network and Distributed System Security Symposium, Internet Society, Jan. 1999.

Pohlig et al., "An Improved Algorithm for Computing Logarithms Over GF(p) and Its Cryptographic Signigicance," IEEE Transactions on Information Theory, 24: 106-110, 1978.

Pointcheval et al., "Probably Secure Blind Signature Schemes," Advances in Cryptology, Proceedings of the ASIACRYPT'96, pp. 252-265, Kyongju, Korea, Nov. 1996, Springer 1996.

Rankl, "Handbuch der Chipkarten," HANSER_VERLAG, 2002, Munchen 050428, 203-210.

Rivest et al, "A Method for Obtaining Digitan Signatures and Public-Key Cryptosystems," Communications of the ACM, 21: 120-126, 1978.

"Skipjack and Kea Specifications," NIST, pp. 1-23, May 29, 1998 retrieved on Jul. 10, 2001 from http://csrc.nist.gov/encryption/skipjack-kea.htm.

Stadler et al., "Fair Bling Signatures," Advances in Cryptology, Proceedings of the EUROCRYPT '95, pp. 209-219, International Conference on the Theory and Application of Cryptographic Techniques, Saint-Malo, France, May 21-25, 1995, Springer 1995.

von Solms et al., "On Blind Signatures and Perfect Crimes," Computer and Security, 11: 581-583, 1992.

Wu, "The Secure Remote Password Protocol," Proceedings of the 1998 Network and Distributed System Security Symposium, pp. 1-15, Internet Society, Jan. 1998.

Zuccherato, "Methods for Avoiding the 'Small Subgroup' Attacks on the Diffie-Hellman Key Agreemnent for S/MIMI,"IETF Internet-Draft, pp. 1-11, Jun. 1999, retrived on Aug. 29, 2001 from http://www.ietf.org/proceedings/99:ul/1-D/draft/ieft-smime-small0subgroup-ol.txt.

International Search Report for PCT/US2006/005606, mailed on Aug. 1, 2006.

* cited by examiner

METHOD AND APPARATUS FOR SECURE VALIDATION OF TOKENS

BACKGROUND

Computer networks, and in particular Wide Area Networks (WANs) such as the Internet, provide opportunities for the misuse and abuse of communications traveling thereover. For example, two users communicating via the WAN may have their communications intercepted and/or altered. Also, it is possible for one user to misrepresent its identity to another user. Thus, there is a need for both privacy and authentication between users of the network communicating with one another.

In many secure communication applications, a key is required in order to perform certain cryptographic operations such as encryption, decryption, authentication, etc. This key is often referred to as a seed. The seed may comprise, by way of example, an asymmetric key, a symmetric key or other secret shared by two or more entities. One such application is an authentication token, such as the RSA SecurID® authentication token commercially available from RSA Security Inc. of Bedford, Mass. The RSA SecurID® authentication token is used to provide two-factor authentication. Authorized users are issued individually-registered tokens that generate single-use token codes. For example, a different token code may be generated every 60 seconds. In a given two-factor authentication session, the user may optionally be required to enter a personal identification number (PIN) plus the current token code from his or her authentication token. This information is supplied to an authentication entity. The authentication entity may be a person, group, or corporation running a server or other processing device equipped with RSA ACE/Server® software, available from RSA Security Inc. The PIN and current token code may be transmitted to the authentication entity via an agent equipped with RSA ACE/Agent® software, also available from RSA Security Inc. If the PIN and current token code are determined to be valid, the user is granted access appropriate to his or her authorization level. Thus, the token codes are like temporary passwords that cannot be guessed by an attacker, with other than a negligible probability.

An RSA SecurID® token typically contains one or more seeds that are utilized in computing the token outputs. The authentication entity performing the validation of the token outputs requires access to one or more seeds associated with the token in question. Typically, such authentication entities have access to the same seed or set of seeds that the token uses to generate its output. Such seed(s) may be programmed into the token at the time of manufacture.

SUMMARY

The above-mentioned implementations suffer from deficiencies. When the seed is programmed into the token at the time of manufacture, the token must be manufactured by the central encryption authority (i.e., the entity ultimately responsible for providing secure tokens to its customers), or a trusted agent of the central encryption authority, or else the seeds will be insecure. This constraint may be disadvantageous from a business perspective, as it may be economically more efficient to outsource manufacturing to lower costs.

In one implementation, an untrusted third-party manufacturer may assemble the token. In such a case, the token generates its own seed using, at least in part, data unique to that token as well as a secret algorithm and/or cryptographic key that is not known to the manufacturer (but is known by both the token and central encryption authority). The manufacturer is able to associate the data unique to that token with a public serial number or other unique identifier for the token, such that the central encryption authority is able to regenerate the seed using data provided by the manufacturer as well as the secret algorithm and/or cryptographic key. In that way, the manufacturer is kept unaware of the seed associated with the token. A similar approach is described in U.S. patent application Ser. No. 11/824,434, "Secure Seed Provisioning," by William M. Duane, Eric A. Silva, and Marco Ciaffi (Jun. 29, 2007), which is hereby incorporated in its entirety into this document by this reference.

However, in such an implementation, the third-party manufacturer is not able to validate that the token has been built and configured correctly, because the manufacturer is not aware of the seed with which the token is programmed. Thus, the manufacturer is not able to validate that a token code produced by the token is correct. This may be corrected, in some implementations, by giving the manufacturer the secret algorithm and/or cryptographic key in order, but that reduces or eliminates the benefits of the technique.

In order to overcome these deficiencies an improved method of manufacturing a token is provided. In such a method, the untrusted third-party manufacturer is supplied by the central encryption authority with a trusted computing environment that is able to verify token codes produced by the manufactured tokens without disclosing the seeds to the untrusted third-party manufacturer. Methods and apparatus are also provided for validating a token.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Described below is a technique for use in the configuration, seed provisioning, and validation of cryptographic security tokens (e.g., RSA SecurID® authentication tokens) at third party facilities, such as at facilities of a configuration agent, such that a token can be configured and validated without the configuration agent having security-defeating knowledge about the token. In particular, it is desirable to allow third parties to provision a token with a seed, but in such a way that the third party will not know, or be able to construct, the seed after the seed provisioning process is complete. As noted above, the seed may comprise, by way of example, an asymmetric key, a symmetric key, or another secret shared by two or more entities. It is also desirable to allow the third party to validate the token while remaining unaware of the seed.

For example, the third party may be a contract manufacturer assembling tokens. Use of the technique described herein allows the contract manufacturer (after assembling the token) to provision the token with the seed and validate such token such that the contract manufacturer does not know, and does not need to be responsible for, the resulting seed value of the token.

Figure 1:
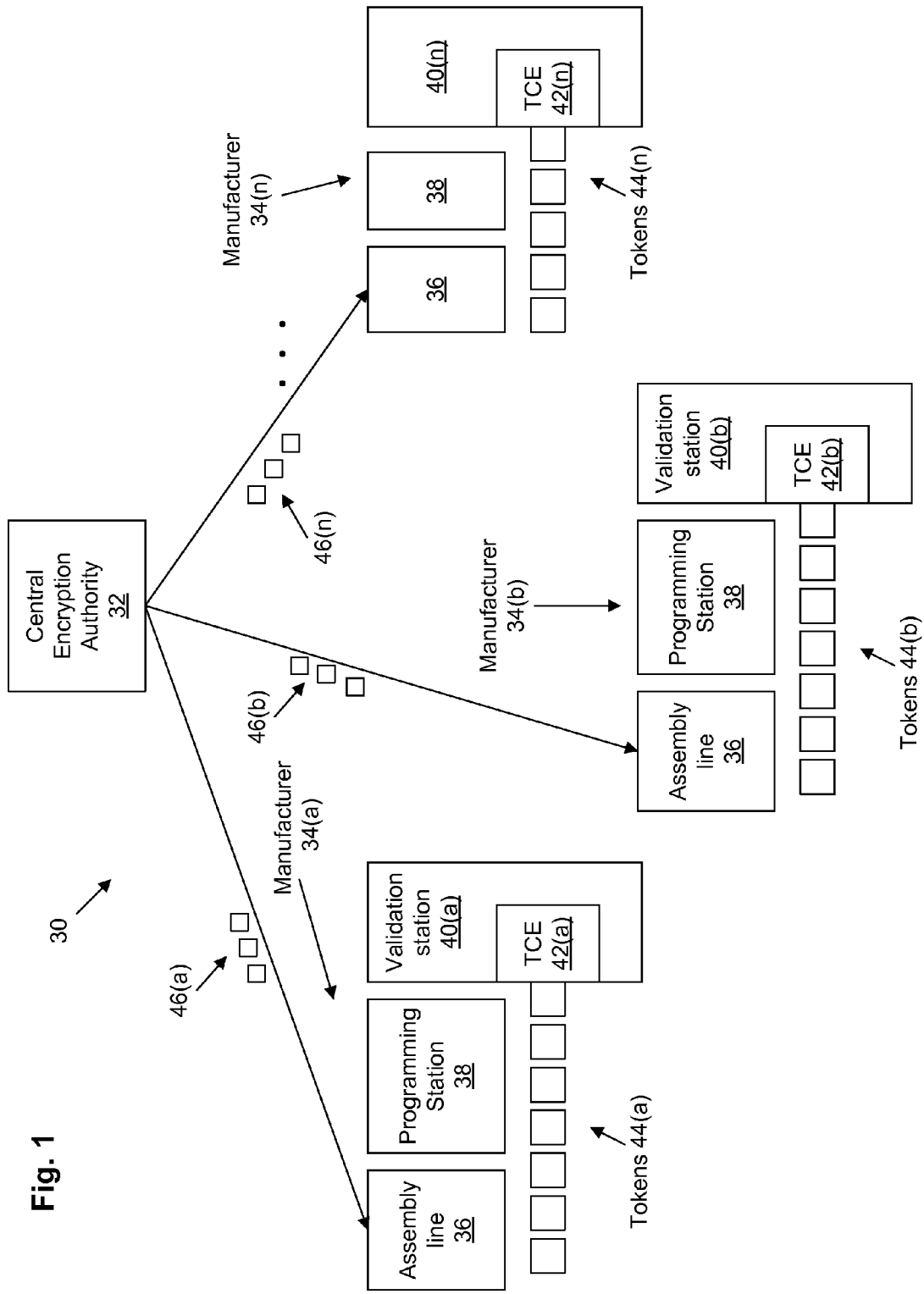
FIG. 1 illustrates an example system for use in performing various embodiments.

FIG. 1 depicts a system 30 for producing cryptographic tokens 44. A central encryption authority 32, such as for example RSA Security Inc. of Bedford, Mass., engages one or more contract manufacturers 34 (depicted as multiple manufacturers 34(a), 34(b), . . . , 34(n)) to produce and validate cryptographic tokens 44. In one embodiment, each contract manufacturer 34 includes an assembly line 36, a programming station 38, and a validation station 40. Validation station 40 includes a trusted computing environment (TCE) 42, provided by the central encryption authority 32. Assembly line 36 assembles cryptographic tokens 44. In some embodiments, tokens 44 are sealed flexible cards, of a size suitable for carrying in a wallet (for example, a smart card, such as an ISO/IEC 7816 compatible card), while in other embodiments, tokens 44 are inflexible handheld devices. Programming station 38 configures cryptographic tokens 44, causing each token 44 to securely establish a seed for itself and, in some embodiments, send programming station 38 a precursor value for the seed. Validation station 40 validates the tokens 44, making sure that each token 44 operates correctly, and that a token code displayed by the token 44 is correct. Validation station 40 accomplishes this validation by inputting the precursor value and the current token code into TCE 42, and allowing TCE 42 to perform internal calculations to determine if the values are consistent. Additional details with respect to the structure/architecture of a TCE 42 are provided below in connection with FIG. 3.

In one embodiment, central encryption authority 32 provides each contract manufacturer 34 with tamper-resistant chips 46 to be placed within tokens 44 during assembly. The tamper-resistant chips 46(a) sent to the first contract manufacturer 34(a) are programmed with a first code $K_{class}(a)$ uniquely associated with the first contract manufacturer 34(a). The tamper-resistant chips 46(b) sent to the second contract manufacturer 34(b) are programmed with a second code $K_{class}(b)$, different from the first code $K_{class}(a)$, uniquely associated with the second contract manufacturer 34(a). The tamper-resistant chips 46(n) sent to additional contract manufacturers 34(n) are programmed with additional distinct codes $K_{class}(n)$ uniquely associated with each additional contract manufacturer 34(n), respectively. The TCE 42 provided to each contract manufacturer 34 is also provided with the code $K_{class}$ (e.g., the first code $K_{class}(a)$ for the first contract manufacturer 34(a)) associated with the particular contract manufacturer 34 (such that the code $K_{class}$ is stored therein in a tamper-resistant manner), however, the codes $K_{class}$ are kept secret, so that the contract manufacturers 34 do not know the codes $K_{class}$. Since each contract manufacturer 34 has a unique code $K_{class}$, a security breach which releases the code $K_{class}$ associated with one manufacturer 34 will not compromise the security tokens 44 produced by other contract manufacturers.

Figure 2:
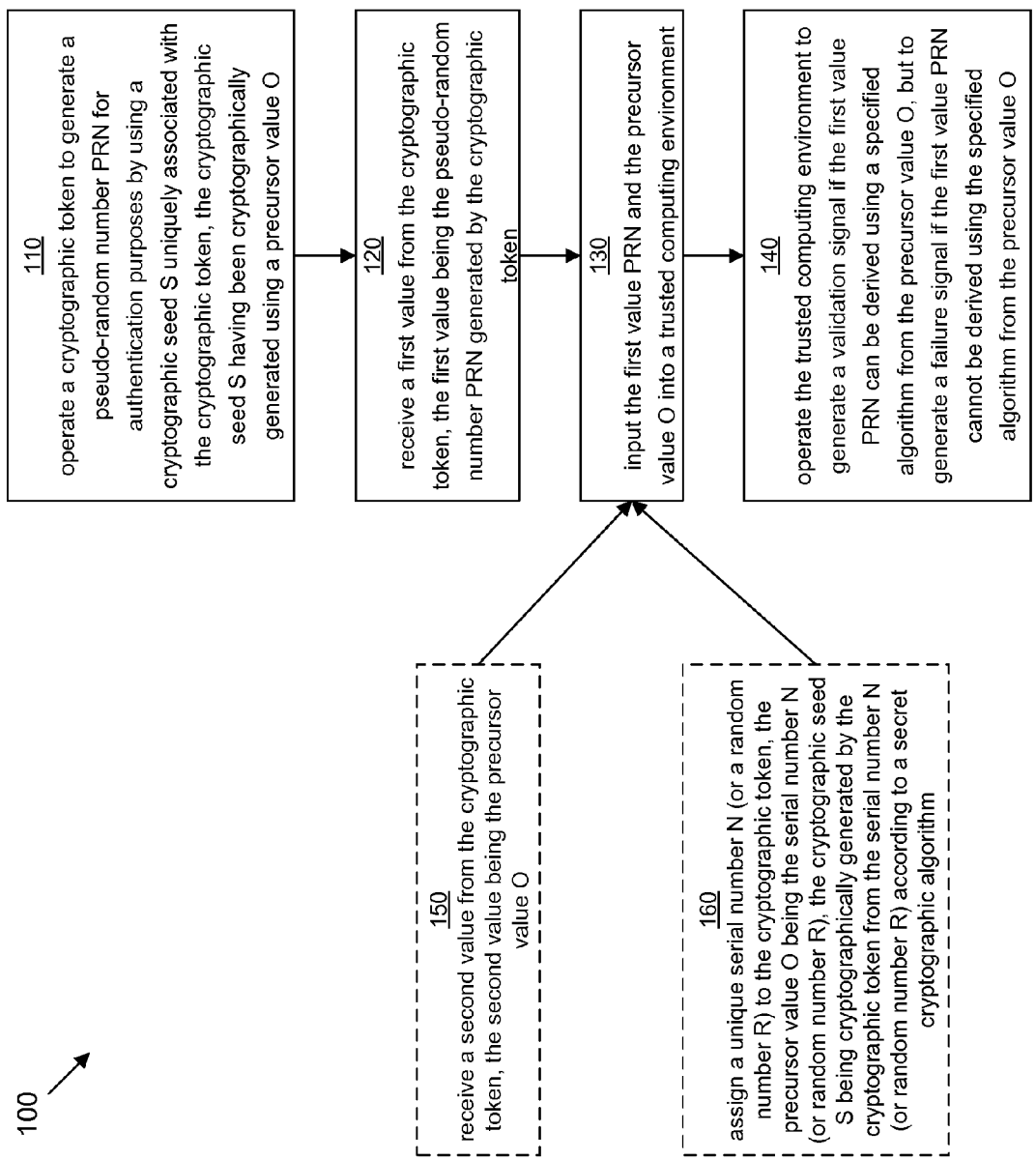
FIG. 2 illustrates a method of one embodiment.

FIG. 2 illustrates a method 100 in accordance with various embodiments. Method 100 may be implemented by, for example, a contract manufacturer 34. In step 110, manufacturer 34 operates a token 44 to generate a pseudo-random number PRN for authentication purposes by using a cryptographic seed S uniquely associated with the token 44. The cryptographic seed S was previously cryptographically generated using a precursor value O, as will be discussed below. Step 110 may preferably be performed by validation station 40.

In step 120, manufacturer 34 receives a first value from the cryptographic token 44, the first value being the pseudo-random number PRN generated by the cryptographic token 44. Step 120 may preferably be performed by validation station 40.

In step 130, manufacturer 34 (preferably through the validation station 40) inputs the first value PRN and the precursor value O into TCE 42. In some embodiments, this may be done by a person employed (or contracted) by the manufacturer 34 entering the values on a keypad of TCE 42 or on a keyboard connected to a computer in contact with the TCE 42. In other embodiments, token 44 may attach directly to TCE 42 by means of a bus, such as a Universal Serial Bus (USB) connection, and the communication therebetween may be performed directly and automatically. In other embodiments, token 44 may attach to a computer by such a bus (in some cases, using robotic fingers to implement the bus connection), while TCE 42 also attaches to the computer by means of a bus (such as a USB or smart card bus, or an internal bus, such as PCI or PCIe).

In step 140, manufacturer 34 operates the TCE 42 to generate a validation signal if the first value PRN can be derived using a specified algorithm from the precursor value O (and possibly other information as well), but to generate a failure signal if the first value PRN cannot be derived using the specified algorithm from the precursor value O. In particular, the specified algorithm may include an algorithm also used by token 44 to generate the seed S so that the TCE 42 may regenerate the same seed S from the precursor value O. Once the seed S is generated, TCE 42 is able to use the seed S to generate an expected pseudo-random number EPRN according to any number of well-known techniques. For example, TCE 42 may use a pre-determined algorithm to generate the expected pseudo-random number EPRN from the seed S and the current time. TCE 42 may instead use a pre-determined algorithm to generate the expected pseudo-random number EPRN from the seed S and a sequence value. In either case, TCE 42 may, in some embodiments, generate a series of expected pseudo-random numbers EPRNs, corresponding to a window of options. This will be discussed in further detail below. If the EPRN (or any EPRN within an appropriate window) matches the first input value PRN, then TCE 42 generates a validation signal. Otherwise, the TCE 42 generates a failure signal.

In the event of a validation signal, manufacturer 34 may mark the token 44 as valid, and, for example, allow it to be sold and/or sent to a customer for use. In the event of a failure signal, manufacturer may discard the token 44. Alternatively, manufacturer 34 may set the failed token 44 aside and attempt to reconfigure it later.

In some embodiments, optional step 150 is performed by manufacturer 34. In step 150, manufacturer 34 receives a second value from the cryptographic token 44, the second value being the precursor value O. Step 150 may precede steps 110 and 120 (if for example, it was performed while programming station 38 initially configured token 44).

In other embodiments, optional step 160 is performed by manufacturer 34. In step 160, manufacturer 34 (in particular, this may be performed by programming station 38 while initially configuring the token 44) assigns a unique serial number N (or, in one embodiment, a randomly generated number R) to the cryptographic token 44. During initial configuration, the seed S is cryptographically generated by the cryptographic token 44 from the serial number N (or the random number R) according to a secret cryptographic algorithm. Serial number N (or the random number R), which is known to manufacturer 34 because it assigned it to begin with, is then used as precursor value O, so it is input into TCE 42 in step 130 by manufacturer 34 (preferably through validation station 40). This allows TCE 42 to regenerate the seed S by applying the secret cryptographic algorithm to the serial number N (or the random number R). This is possible, because the secret cryptographic algorithm is known both to the token 44 and to the TCE 42 44, even though it remains unknown to the other components of manufacturer 34. In some embodiments, the secret cryptographic algorithm contains both a secret algorithm and a secret key, while in other embodiments, only one of the algorithm or the key is actually kept secret.

Figure 3:
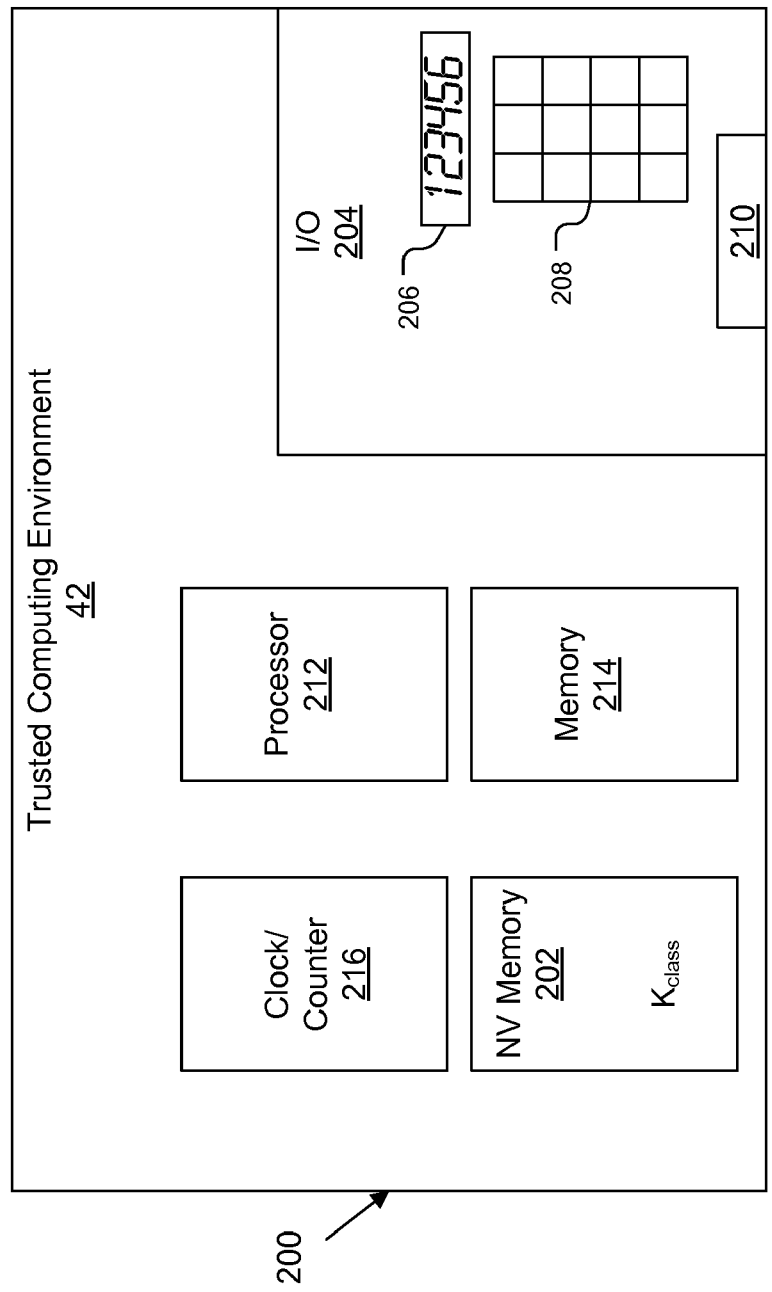
FIG. 3 illustrates an apparatus of one embodiment.

FIG. 3 illustrates an example TCE 42 in accordance with various embodiments. In some embodiments, TCE 42 is physically equivalent to a token 44, the difference being in the programming. In some such embodiments, the TCE 42 is a sealed flexible card, of a size suitable for carrying in a wallet (for example, a smart card, such as an ISO/IEC 7816 compatible card). In other embodiments, TCE 42 is a larger standalone appliance. In other embodiments, TCE 42 is an expansion card (such as, for example, a Peripheral Component Interconnect (PCI) card, a PCIe card, or a CardBus card). In many of these embodiments, TCE 42 has a body 200, which is preferably tamper-resistant. Contained within body 200 is a portion of non-volatile memory 202 storing a code $K_{class}$ associated with a particular contract manufacturer 34. If the body 200 of TCE 42 is tampered with, non-volatile memory 202 is preferably configured to be erased, thus ensuring the security of the code $K_{class}$. TCE 42 also contains an input/output (I/O) portion 204. In one embodiment, I/O portion 204 may contain a digital display screen (such as, for example, an LED or LCD display) 206 and a keypad/keyboard 208. Although digital display screen 206 has been depicted as displaying 6 digits, in fact the screen 208 may display any number of digits, preferably enough digits to display any number required (for example, if precursor value O is a 32-bit value, then 8 hexadecimal digits are required to display it). In another embodiment, I/O portion may contain a bus port (such as, for example, a USB port or a PCI, PCIe, smart card, or CardBus interconnect) 210 for connecting to a token 44. TCE 42 also contains a processor 212 for performing various operations in accordance with method 300, described below, as well as memory 214 and an optional clock and/or counter unit 216. Memory 214 stores data received from the I/O portion 204. Memory 214 may also store instructions for the processor 212 to execute, although these instructions may instead be stored in non-volatile memory 202. Clock and/or counter unit 216 may provide a clock signal to the processor 212. Clock and/or counter unit 216 may also provide the time or a sequence value in order to allow synchronization with a token 44. In some embodiments, processor 212 may be, for example, a general purpose microprocessor embodied on a microchip. In other embodiments, processor 212 may contain special-purpose hardware circuits for performing specific functions associated with method 300. These circuits may be embodied on a microchip. In some embodiments, the circuits may be embodied on a plurality of connected microchips, while in yet other embodiments, the circuits may include circuit components soldered directly onto a circuit board.

Figure 4:
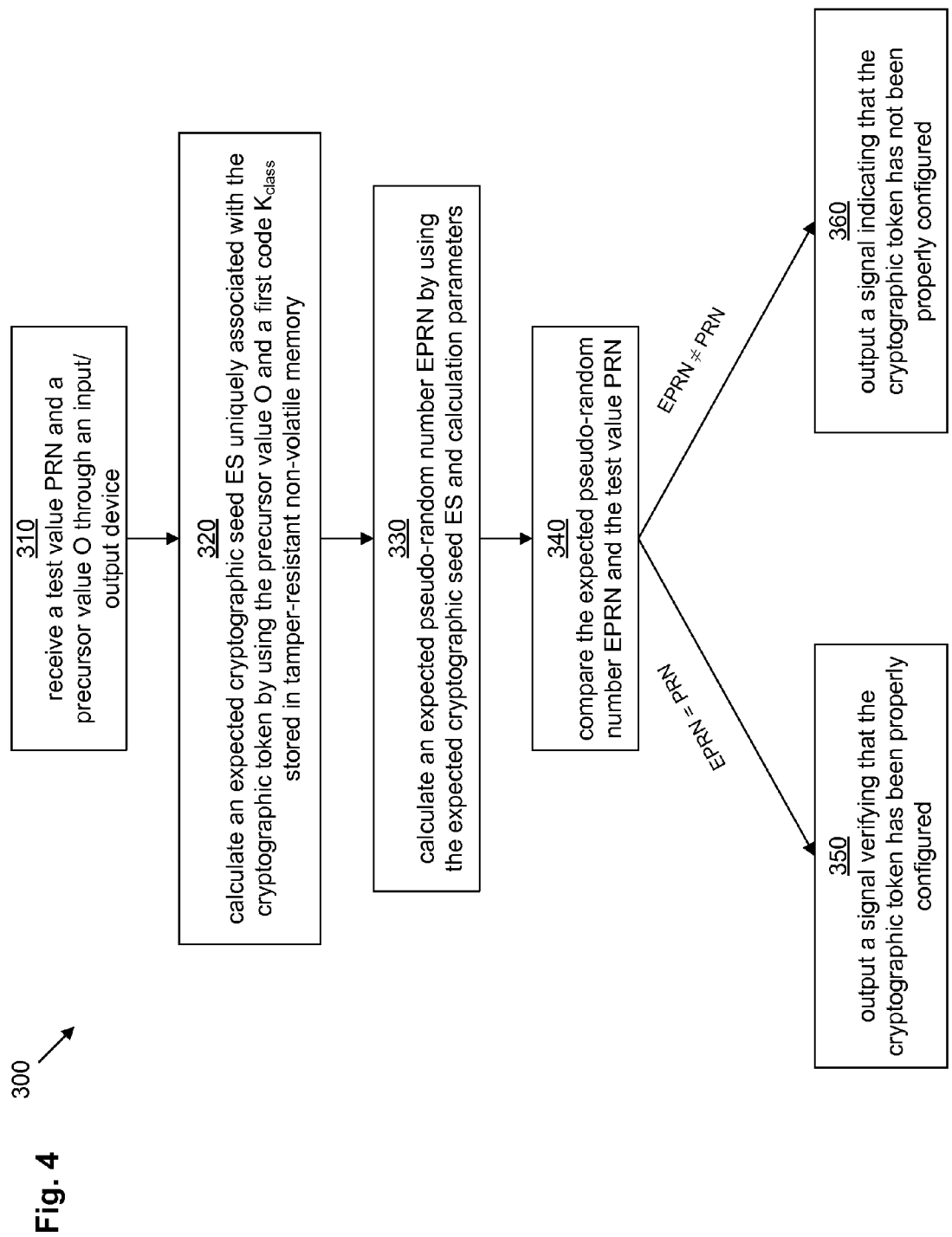
FIG. 4 illustrates a method of one embodiment.

FIG. 4 illustrates a method 300 in accordance with various embodiments. Method 300 may be performed, for example, by TCE 42. In step 310, TCE 42 receives a test value PRN and precursor value O, and optionally other data, through I/O portion 204. In some embodiments, a user employed or contracted by the manufacturer 34 inputs one or both values into keypad 208 after reading the corresponding value from a display screen on a token 44 being tested. In some embodiments, token 44 connects to USB port 210 and transmits one or both values across the bus directly. In other embodiments, token 44 may attach to a computer by such a bus (in some cases, using robotic fingers to implement the bus connection), while TCE 42 also attaches to the computer by means of a bus (such as a USB or smart card bus, or an internal bus, such as PCI or PCIe).

In step 320, TCE 42 calculates an expected cryptographic seed ES uniquely associated with the cryptographic token 44 by using the precursor value O, optional additional data, and a first code $K_{class}$ stored in tamper-resistant non-volatile memory 202. In some embodiments, precursor value O is merely the serial number N (or another random number) assigned to the token 44. In other embodiments, precursor value O is an intermediate value calculated by token 44 on the way to calculating seed S. Thus, in order for TCE 42 to calculate the expected seed ES, processor 212 reads precursor O from memory 214 and $K_{class}$ from non-volatile memory 202 (or in some embodiments also from memory 214) and performs cryptographic operations on precursor value O using $K_{class}$ as an input to the cryptographic operation, storing ES in memory 214. The cryptographic operation may be, for example, an encryption, a cryptographic hash, or any number of similar functions. In some embodiments, the details of the cryptographic operation are kept secret, the secret being known only to the tokens 44, the TCE 42, and the central encryption authority 32.

In step 330, TCE 42 calculates an expected pseudo-random number EPRN by using the expected cryptographic seed ES and calculation parameters. Processor 212, using a predetermined algorithm (known at least to the tokens 44, the TCE 42, and the central encryption authority 32) generates a random number based on the expected cryptographic seed ES and an additional parameter, such as the current time or a sequence value, as produced by the clock and/or counter unit 216. In some embodiments, further parameters, such as serial number N, are used in the calculation as well. Processor 212 may store this generated number as the expected pseudo-random number EPRN in memory 214.

In some embodiments, the current time is rounded down to the closest (or previous) minute, and that minute value is used in the above calculation. This allows the PRN and the EPRN to match when they are calculated in close proximity. In other embodiments, a sequence value is stored for each token 44, and that sequence value is used in the calculation, the sequence value being incremented on both the token 44 and the TCE 42.

In step 340, TCE 42 compares the calculated expected pseudo-random number EPRN and the received test value PRN. If the values match, then operation proceeds to step 350. Otherwise, operation proceeds to step 360.

Within step 340, in order allow for minor synchronization errors, a windowing technique may be used. Thus, for example, in an embodiment in which minutes are used, an inner window, of, for example, 1 minute is provided, while an outer window of, for example, 10 minutes is provided. If the EPRN and the received PRN do not match, then processor 212 recalculates EPRN for every value within the inner window, in this case for 1 minute before and 1 minute after the original minute value. If PRN and EPRN match within that inner window, then the code is valid, but a clock correction factor (or in the case of sequence numbers, a sequence number correction factor) may be stored in association with the token 44 (such correction factor, later to be sent to central encryption authority 32). Otherwise, processor 212 recalculates EPRN for every value within the outer window, in this case for 10 minutes before and 10 minutes after the original minute value. If PRN and EPRN match within that outer window, then the token 44 (or a user operating the token 44)

is prompted to send a new PRN in a successive minute. If the second PRN successfully matches, then the code is valid, but a correction factor must be applied, as above.

In some embodiments, when the calculations are done in dedicated hardware, an inner window of 1 minute is used, and an outer window of 10 minutes is used. In other embodiments, when the calculations are done in software, an inner window of 10 minutes is used, and an outer window of 70 minutes is used.

In step 350, TCE 42 outputs a signal verifying that the cryptographic token 44 has been properly configured. In some embodiments, such a validation signal may be displayed on display screen 206. In other embodiments, the validation signal may be transmitted across bus port 210. A validation signal indicates that the token 44 is valid, and that it may therefore be processed further as needed and sold and/or sent to a customer.

In step 360, TCE 42 outputs a signal indicating that the cryptographic token 44 has not been properly configured. In some embodiments, such a failure signal may be displayed on display screen 206. In other embodiments, the failure signal may be transmitted across bus port 210. A failure signal indicates that the token 44 is not valid, and that it should either be re-configured or discarded and destroyed.

In one embodiment, in order to operate system 30, central encryption authority 32 contracts with several manufacturers 34 to produce tokens. Examining the case of one particular manufacturer 34(a) in more detail, central encryption authority 32 assigns a first code $K_{class}(a)$ to that manufacturer 34(a) and sends manufacturer 34(a) a TCE 42(a) having $K_{class}(a)$ (and in some embodiments, a secret encryption algorithm) securely embedded therein. Central encryption authority 32 also provides manufacturer 34(a) with component chips 46(a), which also securely store $K_{class}(a)$ (and in some embodiments, a secret encryption algorithm). Manufacturer 34(a) assembles the tokens 44(a) on an assembly line 36 (which may be identical to an assembly line 36 used by other manufacturers 34). Manufacturer 34(a) then configures the tokens 44(a) at programming station 38 (which may be identical to a programming station 38 used by other manufacturers 34). Manufacturer 34(a) then validates the tokens 44(a) at validation station 40(a), using TCE 42(a). Details of the configuration and validation stages are provided below in connection with FIG. 5.

Figure 5:
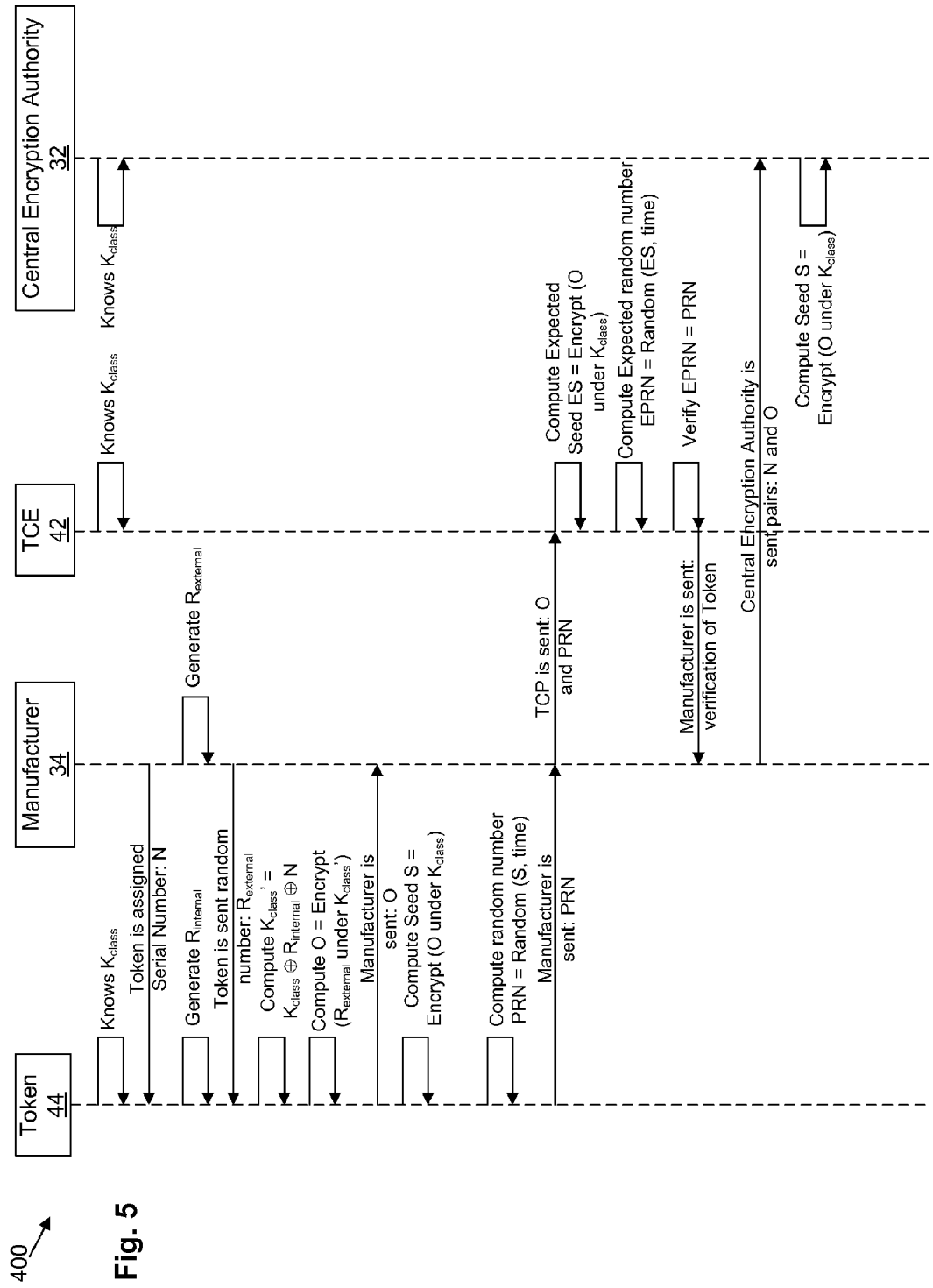
FIG. 5 illustrates a method of one embodiment.

FIG. 5 illustrates the operation 400 of a system of configuring, and validating a cryptographic token 44 in accordance with one embodiment. Token 44, TCE 42, and central encryption authority 32 all have initial knowledge of the code $K_{class}$ assigned to the manufacturer 34. Programming station 38 assigns and sends token 44 a unique serial number N. Token 44 generates a random number $R_{internal}$. $R_{internal}$ may be generated in any one of several ways.

In at least some implementations, the technique may rely on some uniqueness for each token based on at least one of the following sources of variability (i.e., inherent randomness):

1. The token 44 relies on an oscillator section which runs at a frequency which is determined by a number of electronic component based parameters including the characteristics and tolerances of the oscillator section's crystal, the characteristics and tolerances of the capacitors, and tolerances in the characteristics of internal gates of circuitry of the oscillator section. There may also be some other variables including the stray capacitance of a printed circuit board or other substrate on which token components are disposed.

2. There is non uniformity among tokens 44 in powerup characteristics, e.g., the amount of time (latency) between when the token's battery is connected to the processor (e.g., is soldered onto a printed circuit board of the token), which essentially starts the oscillator section running, and when the token 44 is configured.

3. The token's RAM reliably may power up with random data.

4. The token may have a built in random number generator.

In at least some implementations, the technique uses at least the first two sources of variability to generate random number $R_{internal}$. In at least one example implementation, token 44 includes a large counter, e.g., 32 bits wide, which is started as soon as the battery is connected to the processor (e.g., by soldering). This counter is incremented by a software (e.g., firmware instruction) loop having an execution speed that is controlled by the frequency of the oscillator section. The component-based parameters for each token 44 cause the oscillator section, and therefore the loop, to operate at a rate which varies slightly from token to token.

When the token 44 receives a configuration command, which is not synchronized with battery connection, the counter is stopped and sampled, which yields a counter value (which may be used as $R_{internal}$). The combination of the slightly different oscillator frequency and the non uniformity in latency between battery connection and token configuration as described above yield counter values which vary with significant unpredictability from token to token.

In other implementations other ways may be used instead or as well to generate or help generate a unique counter value per token.

The unique counter value per token may be used to help provide the following features:
  Two tokens programmed with the same configuration data end up with different seeds.
  The manufacturer 34 performing the configuration of the token 44, who potentially can read all the data going into and coming out of the token 44, cannot determine the resulting seed S from this data.
  The central encryption authority 32 can re-construct the seed S so that a token seed record can be created.
  The resulting seed S maintains a high entropy.

In the example implementation, the first type of the technique can be used to help provide these features, by:
  Using the counter $R_{internal}$, discussed above,
  Using a key $K_{class}$, known by the token 44 and by the central encryption authority 32, but not known to the manufacturer 34, and
  Injecting a high quality random number $R_{external}$ during configuration.

In the example implementation:
  $R_{internal}$ is m-bits (e.g., 32 bits) of pseudo-random data generated by the token 44 (e.g., in the form of the counter value described above, or based on the contents of RAM at powerup),
  $R_{external}$ is 128-bits of random data loaded from an external source of randomness,
  $K_{class}$ is 128-bit secret that is common to all tokens 44 within a given class (e.g., a token type produced by a specific manufacturer 34),
  N is the serial number assigned to the token 44,
  O is an output of the token 44 which can be used by the central encryption authority 32 to reconstruct the token's seed S, and
  S is the token's seed.

With respect to the example implementation, the technique may by executed as follows.

1. The token internally generates $R_{internal}$.
2. $R_{external}$ is generated by the programming station 38.

3. $R_{external}$ is sent to the token 44 from the programming station 38.

4. The programming station 38 assigns serial number N uniquely to the token 44.

5. The token 44 computes $K_{class}' = K_{class}$ XOR $R_{internal}$ (left aligned) XOR N (right aligned). (The data blocks for the values of $R_{internal}$ and N should be aligned such that the $R_{internal}$ data lines up with padding from N and vice versa, e.g., 2D E7 FF FF FF FF FF FF XOR FF FF FF FF FF FF 12 34.) ("XOR" denotes bit-wise addition modulo two.)

6. The token 44 encrypts $R_{external}$ under key $K_{class}'$ to produce O.

7. The token 44 outputs O to the programming station 38.

8. The token 44 encrypts O under $K_{class}$ to produce seed S.

9. The token 44 stores seed S.

10. The token 44 generates a pseudo-random number PRN using seed S and time or sequence values.

11. The token 44 sends the pseudo-random number PRN to the validation station 40.

12. The programming station 38 sends O to the validation station 40, and the validation station 40 inputs O and the pseudo-random number PRN (as well as, in some embodiments, serial number N) into the TCE 42.

13. TCE 42 computes the expected seed ES=Encrypt(O under $K_{class}$).

14. TCE 42 generates the expected pseudo-random number EPRN using the expected seed ES and time or sequence values and any additional parameters needed (as done in the token 44).

15. TCE 42 compares EPRN to PRN, and, if they are equal, generates a validation signal, sent to validation station 40.

16. Upon receiving the validation signal from TCE 42, manufacturer 34 sends pairs of serial numbers N and outputs O to the central encryption authority 32.

17. The central encryption authority 32 computes S from O and $K_{class}$ (for use in authentication as described above) and provides pairs (N, S) to an authentication entity.

18. The validated token may be sent to a user for use in conjunction with the authentication entity.

In at least some implementations, the following characteristics are provided and are important:

$R_{internal}$, $K_{class}$, $K_{class}'$, and S are all kept secret. (In at least some cases the technique assumes an attacker can see $R_{external}$, O, and N, but this is not enough for the attacker to compute S.)

If $R_{internal}$ is implemented as a counter value, it is not reset to zero when the token 44 is reset. A specific example implementation operates as follows. The counter is stopped when the token 44 receives a configure command, and the current counter value is used as $R_{internal}$. The counter remains stopped, but retains its current value until the token 44 receives a reset command. Upon receiving a reset command, the token 44 once again starts the counter, but starts counting from where it left off. When the next configure command comes in, the counter is once again stopped to read $R_{internal}$, but again the current value is kept in case the token 44 is reset at some time in the future. Alternatively, it is possible to keep the counter running all the time, but in at least some implementations this arrangement would be impractical as it would quickly run down the battery.

The manufacturer 34 knows only O and $R_{external}$.

O is unique to every token 44.

After configuration, the token 44 retains the $R_{internal}$ value used by the technique. When the token 44 is issued a reset command to prepare it to be re-configured, the token 44 starts counting from where it left off, and then stops counting when a new configuration command is received. This helps prevent an attack in which the attacker issues a software reset command with the purpose of resetting $R_{internal}$ so that it can be stopped in a known state by the rapid issuance of a new configuration command after the software reset command.

While various embodiments of the invention have been particularly shown and described, it will be understood by those skilled in the art that various changes in form and details may be made therein without departing from the spirit and scope of the invention as defined by the appended claims.

I claim:

1. A machine for verifying that a cryptographic token has been properly configured, the cryptographic token having been produced by a manufacturer in possession of the machine, the machine comprising:
    tamper-resistant non-volatile memory, the non-volatile memory storing a first secret code;
    an input/output device;
    a processor, the processor being configured to:
        receive a test value through the input/output device;
        receive a precursor value through the input/output device;
        calculate an expected cryptographic seed uniquely associated with the cryptographic token by using the precursor value and the first secret code stored in tamper-resistant non-volatile memory;
        calculate an expected pseudo-random number by using the expected cryptographic seed and calculation parameters;
        compare the expected pseudo-random number and the test value; and
        if the expected pseudo-random number equals the test value, then output a signal verifying that the cryptographic token has been properly configured, otherwise output a signal to the manufacturer in possession of the machine indicating that the cryptographic token has not been properly configured;
    wherein:
    the precursor value received through the input/output device is received from the cryptographic token, the precursor value having been calculated by the cryptographic token; and
    the test value received through the input/output device is received from the cryptographic token, the test value having been calculated by the cryptographic token using a secret cryptographic seed stored on the cryptographic token;
    calculation of the precursor value by the cryptographic token includes:
        the cryptographic token receiving a serial number uniquely assigned to the cryptographic token by the manufacturer not in possession of the first secret code; and
        the cryptographic token mathematically combining the serial number with the first secret code; and
    calculation of the test value by the cryptographic token includes the cryptographic token mathematically combining the precursor value with the secret cryptographic seed.

2. A machine as in claim 1 wherein:
    the input/output device is a serial bus port for connecting to the cryptographic token; and
    the output signal is sent over the serial bus port.

3. A machine as in claim 1 wherein:
    the input/output device includes:
        a keypad; and a display screen; and the processor is configured to:

receive the test value through the keypad, the test value being copied from a display of the cryptographic token upon the cryptographic token generating the test value;

receive the precursor value through the keypad, the precursor value being copied from a display of the cryptographic token upon the cryptographic token generating the precursor value;

output the signal verifying that the cryptographic token has been properly configured by displaying a verification signal on the display screen; and output the signal indicating that the cryptographic token has not been properly configured by displaying a failure signal on the display screen.

4. A machine as in claim 1 wherein the machine is housed within a sealed flexible card.

5. A machine as in claim 1 wherein the processor is configured to calculate the expected cryptographic seed by encrypting the precursor value with the first secret code as encryption key according to a specified algorithm.

6. A machine as in claim 5 wherein:

the precursor value is a serial number associated with the cryptographic token; and the specified algorithm is a secret cryptographic algorithm.

7. A method of validating a cryptographic token at a trusted computing module, the cryptographic token having been produced by a manufacturer in possession of the trusted computing module, the method comprising:

receiving a test value through an input/output device;

receiving a precursor value through the input/output device;

calculating an expected cryptographic seed uniquely associated with the cryptographic token by using the precursor value and a first secret code stored in tamper-resistant non-volatile memory;

calculating an expected pseudo-random number by using the expected cryptographic seed and calculation parameters;

comparing the expected pseudo-random number and the test value; and if the expected pseudo-random number equals the test value, then outputting a signal verifying that the cryptographic token has been properly configured, otherwise outputting a signal to the manufacturer in possession of the trusted computing module indicating that the cryptographic token has not been properly configured;

wherein receiving the precursor value through the input/output device includes receiving the precursor value from the cryptographic token, the precursor value having been calculated by the cryptographic token;

receiving the test value through the input/output device includes receiving the test value from the cryptographic token, the test value having been calculated by the cryptographic token using a secret cryptographic seed stored on the cryptographic token;

calculation of the precursor value by the cryptographic token includes:

the cryptographic token receiving a serial number uniquely assigned to the cryptographic token by the manufacturer not in possession of the first secret code; and the cryptographic token mathematically combining the serial number with the first secret code; and calculation of the test value by the cryptographic token includes the cryptographic token mathematically combining the precursor value with the secret cryptographic seed.

8. A method as in claim 7 wherein calculating the expected cryptographic seed includes encrypting the precursor value with the first secret code as encryption key according to a specified algorithm.

9. A method as in claim 8 wherein:

the precursor value is a serial number associated with the cryptographic token; and the specified algorithm is a secret cryptographic algorithm.

10. A machine as in claim 1 wherein:

the cryptographic token mathematically combining the serial number with the first secret code includes the cryptographic token:

internally generating a first random number;

performing a bitwise exclusive-or operation on the first secret code, the serial number, and the first random number to generate a revised secret code;

receiving, from the manufacturer, a second random number; and encrypting the second random number using the revised secret code as an encryption key, yielding the precursor value;

the cryptographic token mathematically combining the precursor value with the secret cryptographic seed includes the cryptographic token:

encrypting the precursor value using the first secret code as an encryption key, yielding the secret cryptographic seed;

storing the secret cryptographic seed on the cryptographic token; and generating a pseudo-random number using the secret cryptographic seed as a seed value and a time value as a calculation parameter.

11. A method as in claim 7 wherein:

the cryptographic token mathematically combining the serial number with the first secret code includes the cryptographic token:

internally generating a first random number;

performing a bitwise exclusive-or operation on the first secret code, the serial number, and the first random number to generate a revised secret code;

receiving, from the manufacturer, a second random number; and encrypting the second random number using the revised secret code as an encryption key, yielding the precursor value;

the cryptographic token mathematically combining the precursor value with the secret cryptographic seed includes the cryptographic token:

encrypting the precursor value using the first secret code as an encryption key, yielding the secret cryptographic seed;

storing the secret cryptographic seed on the cryptographic token; and generating a pseudo-random number using the secret cryptographic seed as a seed value and a time value as a calculation parameter.

12. A method of validating, at a trusted computing module (TCM), a cryptographic token produced by a manufacturer in possession of the trusted computing module, the method comprising:

receiving, at the TCM, a precursor value from the cryptographic token, the precursor value being an intermediate value produced by the cryptographic token while internally generating a token cryptographic seed (TCS) from a secret code stored in the cryptographic token, the TCS and the secret code remaining unknown to the manufacturer;

receiving, at the TCM, a pseudo-randomly generated value under test (PRGVUT) from the cryptographic token, the PRGVUT being a number generated by the cryptographic token by applying a pseudo-random number generation algorithm to the TCS and another parameter, the other parameter being known to both the cryptographic token and the TCM;

calculating, at the TCM, a best-guess cryptographic seed (BGCS) by encrypting the precursor value using the secret code as an encryption key, the secret code being securely stored within tamper-resistant non-volatile memory of the TCM such that the secret code is not accessible to the manufacturer;

generating, at the TCM, a best-guess pseudo-randomly generated value (BGPRGV) by applying the pseudo-random number generation algorithm to the BGCS and the other parameter;

comparing, at the TCM, the BGPRGV to the PRGVUT; and if and only if the BGPRGV is equal to the PRGVUT, then outputting a validation signal from the TCM to the manufacturer in possession of the TCM to inform the manufacturer that the cryptographic token has been properly configured.

13. The method of claim 12 wherein internally generating the TCS from the secret code stored in the cryptographic token includes:

generating a first random number at the cryptographic token;

receiving, at the cryptographic token, a second random number from the manufacturer, the second random number having been generated by the manufacturer;

receiving, at the cryptographic token, a unique serial number from the manufacturer, the unique serial number having been generated by the manufacturer;

mathematically combining, at the cryptographic token, the secret code, the first random number, and the serial number, to yield another secret code;

encrypting, at the cryptographic token, the second random number using the other secret code as an encryption key, to yield the intermediate value; and encrypting, at the cryptographic token, the intermediate value using the secret code as an encryption key, to yield the TCS.

14. A method of producing cryptographic tokens, the method comprising:

providing, from a central encryption authority, a manufacturer with a machine for verifying that a cryptographic token has been properly configured with a secret cryptographic seed;

assigning, by the central encryption authority, a first secret code to the manufacturer, the first secret code being securely embedded in tamper-resistant pre-fabricated chips sent to the manufacturer, the first secret code being kept a secret unknown to the manufacturer;

receiving, at the central encryption authority, for each of a plurality of cryptographic tokens produced by the manufacturer using the pre-fabricated chips, a serial number uniquely assigned to that cryptographic token and a precursor value produced by that cryptographic token;

calculating, using a computer, at the central encryption authority, the secret cryptographic seed for each of the plurality of cryptographic tokens using the first secret code assigned to the manufacturer and the serial number and precursor value received for that cryptographic token;

wherein the machine for verifying that a cryptographic token has been properly configured with a secret cryptographic seed includes:

tamper-resistant non-volatile memory, the non-volatile memory storing the first secret code;

an input/output device;

a processor, the processor being configured to:

receive a test value through the input/output device;

receive the precursor value produced by the cryptographic token through the input/output device;

calculate an expected cryptographic seed uniquely associated with the cryptographic token by using the precursor value and the first secret code stored in tamper-resistant non- volatile memory;

calculate an expected pseudo-random number by using the expected cryptographic seed and calculation parameters;

compare the expected pseudo-random number and the test value; and if the expected pseudo-random number equals the test value, then output a signal verifying that the cryptographic token has been properly configured, otherwise output a signal to the manufacturer in possession of the machine indicating that the cryptographic token has not been properly configured;

wherein:

the precursor value received through the input/output device is received from the cryptographic token, the precursor value having been calculated by the cryptographic token; and the test value received through the input/output device is received from the cryptographic token, the test value having been calculated by the cryptographic token using a secret cryptographic seed stored on the cryptographic token;

calculation of the precursor value by the cryptographic token includes:

the cryptographic token receiving the serial number uniquely assigned to the cryptographic token by the manufacturer not in possession of the first secret code; and the cryptographic token mathematically combining the serial number with the first secret code; and calculation of the test value by the cryptographic token includes the cryptographic token mathematically combining the precursor value with the secret cryptographic seed.

* * * * *